March 15, 1960  C. I. FORS  2,928,440
CHAIN SAW BLADE
Filed May 10, 1957
Fig.1
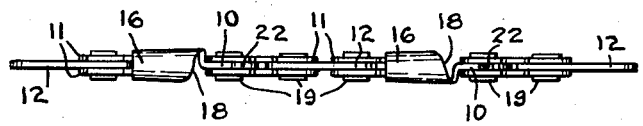
Fig.2
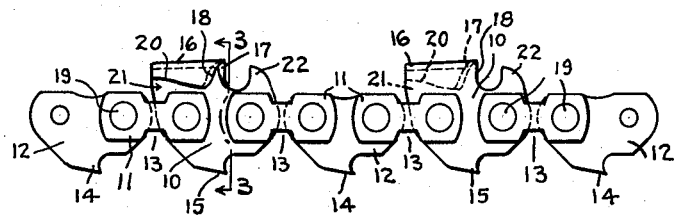
Fig.4 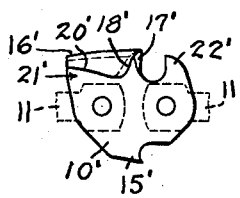 Fig.3  Fig.5 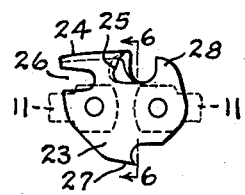 Fig.6 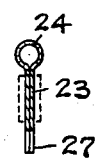
Fig.7
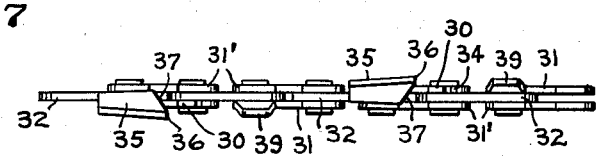
Fig.8
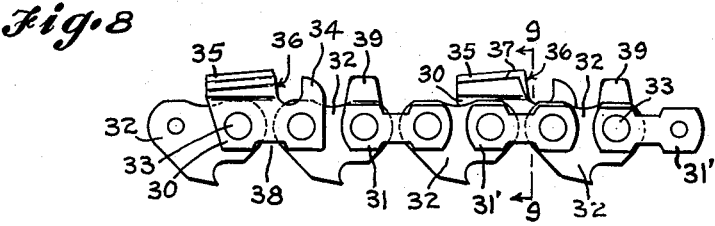
Fig.9
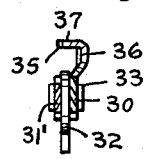
Fig.10
INVENTOR.
Carl I. Fors
BY
Fred C. Matheny
ATTORNEY

United States Patent Office 2,928,440
Patented Mar. 15, 1960

2,928,440

CHAIN SAW BLADE

Carl I. Fors, Seattle, Wash.

Application May 10, 1957, Serial No. 658,411

4 Claims. (Cl. 143—135)

My invention relates to chain saw blades and the general objects of my invention are to render chain saws safer to use and to increase the efficiency and durability of the link type blades used in these saws.

One man power driven chain saws are extensively used in felling and cutting up timber. In cutting through logs or pieces of timber of substantial diameter or size with these saws the cutting is done by the lower lap of the chain saw blade, that is the lap which is moving toward the operator and is lowermost when cutting horizontal pieces. During the latter portion of a cut through a piece of timber of substantial size the lap of the blade which is normally uppermost and which is moving away from the operator is traveling through the cut or kerf made by the lower lap of the blade. Under these circumstances it is possible for the cutting teeth or links of the upper lap of said blade to gouge or dig into the walls of the saw kerf and kick or drive the saw toward and against the operator. This can, and sometimes does severely injure the operator.

An object of my invention is to provide a chain saw blade having teeth shaped and arranged and constructed in such a manner as to prevent them from gouging or digging into the walls of a saw kerf through which the idling lap of the blade is traveling and driving the saw back against an operator with possible injury to the operator.

Ordinary chain saw blades usually have their cutting links or teeth positioned alternately on opposite sides of the chain which forms the blade and each cutting link has a cutting edge on its outer side and on its tip. These saws have a tendency to whip from side to side as they enter the saw cut, due to the alternate off-center positioning of the cutting edges of the links by which the cutting is done. This tendency to whip from side to side is greater when a cut is being started and the whipping often results in the kerf being much wider at the location where it enters the wood than it is deeper in the cut. This sidewise or lateral whipping of the chain saw blade is objectionable because it subjects the blade to side strain and produces a ragged cut, especially at the location where the saw cut is started.

Another object of this invention is to provide a chain saw blade in which all of the cutting links are positioned in the medial plane of the blade and in which each cutting link cuts substantially an equal amount on each side of the medial plane of the blade thereby substantially eliminating the tendency of the chain to whip in sidewise directions, making it possible to reduce the thickness of the blade so that a saving in power results, and providing smoother and more efficient operation of the saw.

Another object of my invention is to provide a chain saw blade which has a guard tooth positioned a short distance in advance of each cutting link and in which the guard teeth operate to prevent the cutting links from gouging into the walls of a saw kerf and thus prevent the saw from being kicked or driven back against the operator.

Other objects of my invention will be apparent from the following description and accompanying drawings.

Figure 1 is an edge view showing the cutting edge of a chain saw blade constructed in accordance with my invention, only a fragment of the blade being shown and it being understood that said blade is of endless construction and of any desired length.

Fig. 2 is a side elevation of the blade section shown in Fig. 1.

Fig. 3 is a view partly in section and partly in elevation taken on broken line 3—3 of Fig. 2.

Fig. 4 is a detached side elevational view of a cutting link of slightly modified form in that it is made of metal which is convergently tapered from the cutting edge rearwardly and the outer portion of the cutting element is slightly curved.

Fig. 5 is a view in side elevation of a cutting link of modified form made by doubling a piece of thin metal and leaving a rounded loop along the folded edge thereof to provide a cutting element, fragments of connector links being shown by dotted lines.

Fig. 6 is a view partly in cross section and partly in elevation taken substantially on broken line 6—6 of Fig. 5.

Fig. 7 is an edge view showing the cutting edge of a section of a chain saw blade of modified form embodying my invention.

Fig. 8 is a side elevation of the blade shown in Fig. 7.

Fig. 9 is a sectional view looking in the direction of broken line 9—9 of Fig. 8, parts being shown in elevation.

Fig. 10 is an edge view of another blade of modified form.

The form of chain saw blade shown in Figs. 1 to 3 comprises cutting links 10 and connector links 11 and 12 all pivotally connected together by pivots 19. The cutting links 10 are disposed in the medial plane of the blade and have connector links 11 on both sides thereof. The connector links 11 and 12 are of conventional form. The links 11 are provided with sprocket tooth receiving notches 13. The connector links 12 are in the medial plane of the blade and alternate with cutting links 10 and each link 12 has a guide fin 14 on its inner edge. The cutting links 10 have similar guide fins 15 on their inner edges and the guide fins 14 and 15 run in suitable grooves in the edge of a frame part of well known form, not shown.

The outer edge of each cutting link 10 is bent circularly to form thereon an integral tubular cutting element 16 of generally cylindrical shape which is slightly larger in diameter at one end, namely the one herein referred to as the leading end, than it is at the other or trailing end. The convergent taper of the cutting elements 16 toward their trailing ends provides needed clearance and minimizes friction and wedging of these parts in the saw kerf. The cutting element 16 is sharpened at its larger end by providing within said larger end an internal bevel 17. This bevel 17 forms a cutting edge 18 on the leading end of the cutting element 16. Also the leading end of the cutting element 16 is biased so that the cutting edge 18 is inclined at other than right angles relative to the length of the chain saw blade. Because of this inclination the cutting edge 18 will make a shearing or slicing cut as it moves through the work. The edges 18 of alternate links incline oppositely.

At the leading end the cutting element 16 is substantially a complete circle but the lateral edge 20 of this cutting element is inclined in such a manner as to provide an exit opening 21 for sawdust or cuttings, said opening 21 being of expanding shape from leading toward trailing end of the cutting element.

A flange or tooth 22, which functions as a gauge to limit depth of cut, is provided on each cutting link 10 in advance of and in spaced relation from the leading end of the cutting element 16 of said link. The cutting edge of each cutting element 16 is arcuate and symmetrical relative to the medial plane of the blade and cuts an equal amount on each side of the medial plane of the blade so that loads and strains are evenly balanced and side deflection and whipping of the blade is substantially done away with. Also making the cutting elements 16 symmetrical relative to the medial plane of the blade substantially eliminates all tendency of the cutting links of the idling lap of the chain saw blade to dig into or snag on the side walls of the saw kerf through which they are idly moving and this substantially does away with the danger of kick back of the saw.

The cutting link 10' shown in Fig. 4 is similar to the link 10, just described, except that the metal of at least the cutting element 16' of this link is of convergently tapered thickness from leading to trailing end and the outer part of the element 16' is curved inwardly to provide improved tooth clearance and to direct sawdust inwardly toward the blade. Parts 15', 17', 18', and 22' of Fig. 4 are similar to the previously described parts 15, 17, 18, and 22, and function in a similar manner.

Figs. 5 and 6 show a cutting link 23 which is similar in shape and configuration to the previously described link 10 but is formed by doubling a piece of thin metal in such a manner as to leave an integral tubular cutting element 24 on the outer edge thereof. The leading end of this cutting element 24 has an inclined cutting edge 25 similar to the previously described cutting edge 18. An exit opening 26 for sawdust is provided in at least one side of the cutting element 24 near the trailing end thereof. The cutting links 23 are each provided with a guide fin 27 and a gauge tooth 28 which are respectively similar to the previously described parts 14 and 22 of the cutting links 10. The cutting links 23 are made right and left and are used alternately in the chain saw blade in the same manner as the previously described cutting links 10. The links 23 function in substantially the same manner as the links 10.

Figs. 7, 8 and 9 illustrate a form of my invention in which all of the parts of a chain saw blade are of conventional construction except that one connector link in advance of the leading end of each cutting link is provided with an outwardly protruding inclined guard tooth which will prevent kick back of the saw by preventing the cutting edge of the next adjacent cutting tooth to the rear from gouging or digging into the side walls of the saw kerf through which these parts are moving idly. Figs. 7, 8 and 9 show a chain saw blade made up of cutting links 30, connector links 31 and 31' and guide links 32, all pivotally connected together in chain form by pivot members 33. The cutting links 30 are of conventional construction and are made right and left for alternate use in the saw blade. Said cutting links 30 each have a transversely offset integral cutting element 35. Each cutting element 35 is wider at its leading end and tapers rearwardly and the leading end thereof has a lateral cutting edge 36 and an outer inclined cutting edge 37 provided thereon. The inner edge of each cutting link 30 has a sprocket tooth receiving notch 38 therein and is provided with a tooth 34 to gauge the depth of cut. The cutting links 30 and connector links 31 are used as outside links and the guide links 32 are used as medial links in forming the blade. A connector link 31 adjacent the leading end of the cutting element 35 of each link 30 is provided with an outwardly protruding guard tooth 39, which outwardly considered, is inclined sidewise away from the medial plane of the blade so that the tip or outer end of each guard tooth 39 is approximately in line with the lateral cutting edge 36 of the next cutting link 30 rearwardly therefrom. The connector links 31 are made right and left and are used alternately on opposite sides of the blade. The connector links 31' are similar to the connector links 31 except that they are not provided with any guard teeth corresponding to guard teeth 39. The guide links 32 are the same as the previously described guide links 12 shown in Figs. 1 and 2 but all of the medial links of the blade shown in Figs. 7, 8 and 9 are guide links 32, whereas in Figs. 1 and 2 the guide links 12 are alternated with cutting links 10.

When the saw blade shown in Figs. 7, 8 and 9 is moving idly through a saw kerf which has been cut by said blade the guard teeth 29 will be in close proximity to the side walls of said saw kerf and will prevent the adjacent cutting links 30 from digging or biting deeply into the side walls of said saw kerf and this substantially eliminates the danger of kick back of the saw and the possibility of injuring the operator in this manner.

It is to be noted that in the construction shown in Figs. 7, 8 and 9 each cutting tooth has one side cutting edge 36 which is positioned to one side of the medial plane of the blade.

Thus in this construction the cutting edge of each cutting link is non-symmetrical as respects the medial plane of the blade. In the constructions disclosed in Figs. 1 to 6 inclusive the cutting edges are substantially symmetrical as respects the medial plane of the blade and there is a cutting edge on each cutting tooth on each side of the medial plane of the blade.

Fig. 10 illustrates the use of guard teeth similar to the guard teeth 39 in a saw blade which is similar to the blade shown in Figs. 1, 2 and 3. Said Fig. 10 shows a saw blade construction in which the connector links 12 and cutting links 10 having parts 16 and 18 are the same as those shown in Figs. 1, 2 and 3 and are similarly numbered. Each connector link 31a shown in Fig. 10 has on its outer edge a guard tooth 39' which extends outwardly and is inclined away from the medial plane of the blade and is similar to the guard teeth 39 of Figs. 7 and 8 except that it is positioned approximately mid way between the two ends of the link. The connector links 31a with guard teeth 39' are used in pairs thus providing two guard teeth 39' in advance of each cutting link 10. This is desirable because each cutting link 10 has a cutting edge on each side of the medial plane of the blade. The guard teeth 39' operate in a manner similar to the guard teeth 39 in preventing kick back of the saw. Obviously the links 31a having the medially positioned guard teeth 39' can be used in place of the links 31 in Figs. 7 and 8 construction. Preferably the corners of both the guard teeth 31 and the guard teeth 39' are slightly rounded.

The foregoing description and accompanying drawings clearly disclose preferred embodiments of my invention but it will be understood that these disclosures are merely illustrative and that changes may be made within the scope of the following claims.

I claim:
1. In an endless chain saw blade, a plurality of cutting links positioned in a common plane; a plurality of connector links positioned alongside of said cutting links and pivotally connected therewith, the cutting links being in the medial plane of the blade; and an integral tubular cutting element provided on the outer edge of each cutting link, one edge portion of each cutting element being integrally united with its cutting link and each cutting element being of generally cylindrical shape and slighlty less than a complete cylinder in cross section leaving a discharge slot for cuttings between the terminal edge of each cutting element and the adjacent part of its cutting link and each cutting element being larger at one end than it is at the other end and terminating at its larger end in a cutting edge which is bisected by the medial plane of the blade for equal cutting on each side of the medial plane of the blade, said cutting links being capable of moving smoothly through their own saw kerf without gouging engagement with the walls of said kerf.

2. In an endless chain saw blade, a plurality of cutting links positioned in a common plane; a plurality of connector links positioned alongside of said cutting links and pivotally connected therewith so that the cutting links are in the medial plane of the blade; and an integrally formed tubular cutting element provided on the outer edge of each cutting link, one edge portion of each cutting element being integrally united with its cutting link, each cutting element being generally cylindrical in shape and slightly less than a complete cylinder in cross section, the other edge portion of each cutting element being spaced from the adjacent part of its cutting link and being inclined recedingly from the leading toward the trailing end of its cutting link leaving an expanding discharge slot for cuttings between said recedingly inclined edge portion and the adjacent part of its cutting link and each cutting element being larger at one end than it is at the other end and terminating at its larger end in a cutting edge which extends sidewise an equal distance from each side of the medial plane of the blade and which is inclined relative to a plane transverse to the plane of the blade, whereby said cutting edge will make a slicing cut as the blade is moved lengthwise through wood.

3. In a endless chain saw blade, a plurality of cutting links positioned in a common plane; a plurality of guide links alternating with said cutting links and positioned in the same plane as said cutting links; a plurality of connector links positioned alongside of said cutting links and said guide links and pivotally connected therewith so that the cutting links and guide links are in the medial plane of the blade; an integrally formed tubular cutting element provided on the outer edge of each cutting link, one edge portion of each cutting element being integrally united with its cutting link and each cutting element being of generally cylindrical shape and slightly less than a complete cylinder in cross section leaving a discharge slot for cuttings between the terminal edge of each cutting element and the adjacent part of its cutting link and each cutting element terminating at one end in a cutting edge which is diagonal to and bisected by the medial plane of the blade, whereby it will cut equal amounts on each side of the medial plane of said blade; and at least one outwardly and laterally extending guard tooth on a connector link next in advance of each cutting link, each tooth having a terminal part offset sidewise from the medial plane of the blade a distance slightly less than the maximum transverse offset of the cutting element of the adjacent cutting link, whereby said guard tooth prevents snagging of the cutting element on the wall of a saw kerf.

4. In an endless chain saw blade, a plurality of cutting links positioned in a common plane; a plurality of guide links alternating with said cutting links and positioned in a common plane with said cutting links; a pluralty of connector links positioned in pairs alongside of said cutting links and said guide links and pivotally connected therewith so that the cutting links and guide links are in the medial plane of the blade; an integrally formed cutting element provided on the outer edge of each cutting link, one edge portion of each cutting element being integrally united with its cutting link and each cutting element being of generally cylindrical shape and slightly less than a complete cylinder in cross section leaving a discharge slot for cuttings between the terminal edge of each cutting element and the adjacent part of its cutting link and each cutting element terminating at one end in a cutting edge which is diagonal to and bisected by the medial plane of the blade, whereby it will cut equal amounts on each side of the medial plane of the blade; and an outwardly and laterally extending guard tooth provided medially of the length of each connector link, whereby two aligned divergent guard teeth are provided in advance of each cutting tooth, each guard tooth having its terminal part offset sidewise from the medial plane of the blade a distance slightly less than the maximum transverse offset of the cutting element of the adjacent cutting link, said guard teeth preventing snagging of the adjacent cutting elements in the wall of a saw kerf.

References Cited in the file of this patent

UNITED STATES PATENTS

| | | |
|---|---|---|
| 2,534,591 | Geurian | Dec. 19, 1950 |
| 2,558,678 | Garrett | June 26, 1951 |
| 2,658,537 | Ackley | Nov. 10, 1953 |
| 2,713,276 | Siverson | July 19, 1955 |
| 2,736,352 | Wright | Feb. 28, 1956 |
| 2,747,623 | Cox | May 29, 1956 |

FOREIGN PATENTS

| | | |
|---|---|---|
| 185,564 | Austria | May 11, 1956 |